United States Patent Office 3,050,723
Patented Aug. 21, 1962

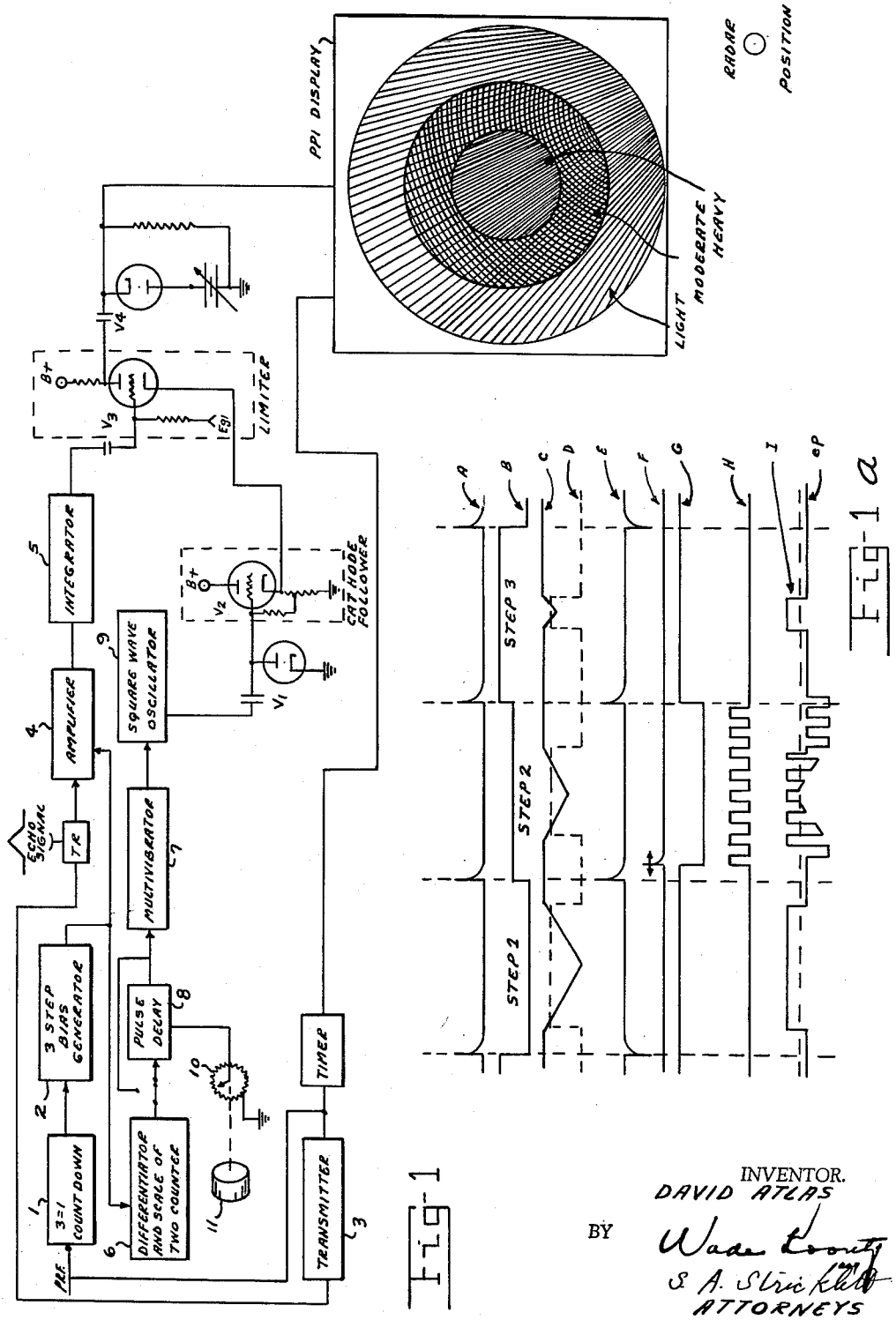

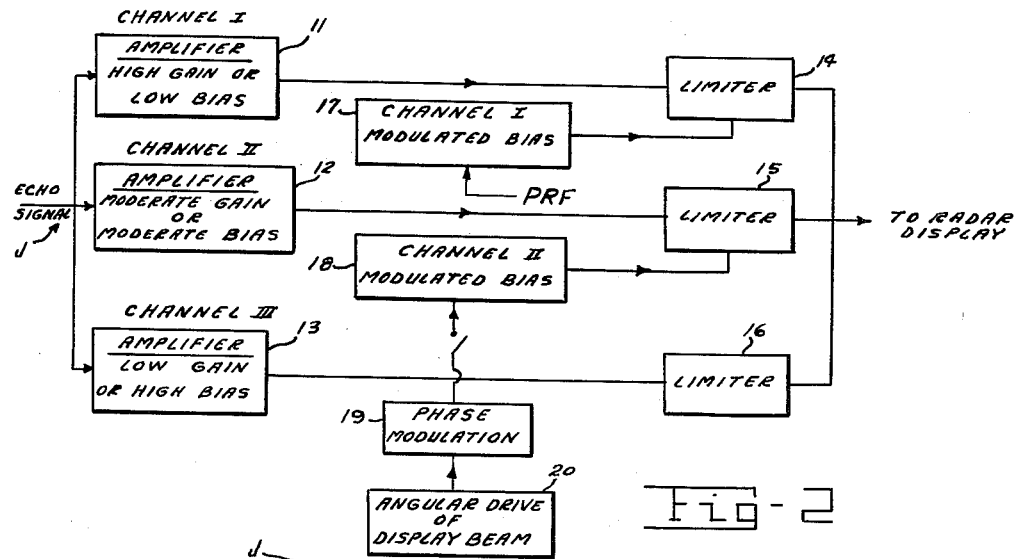
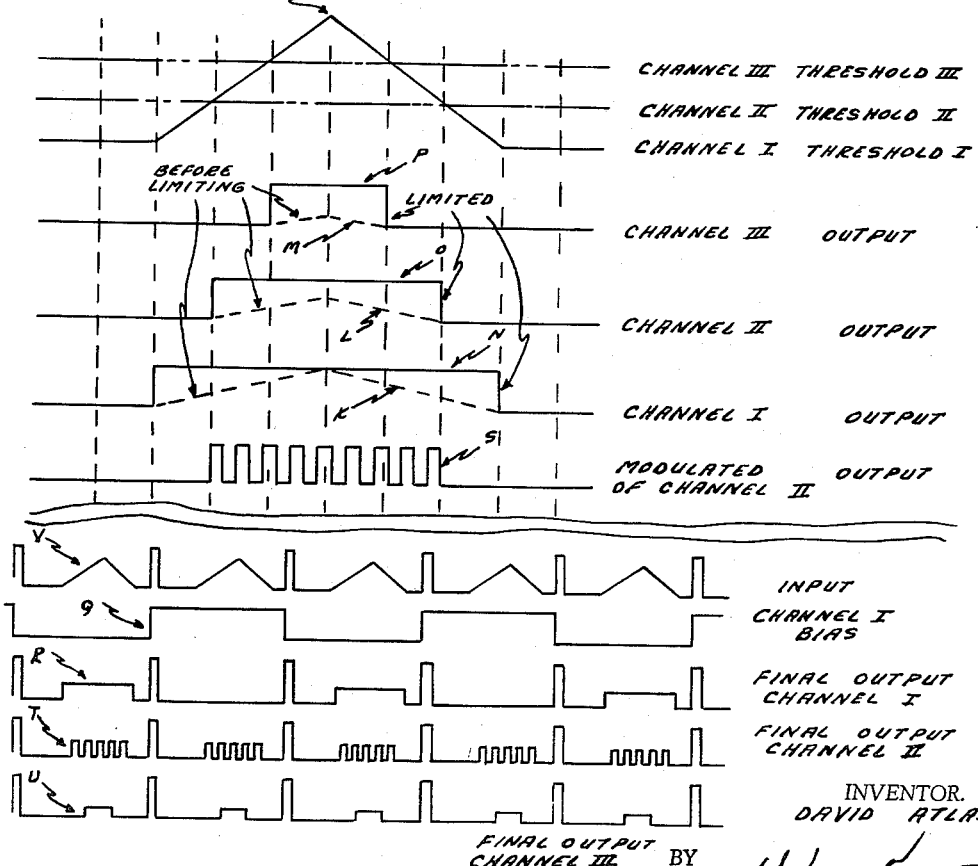

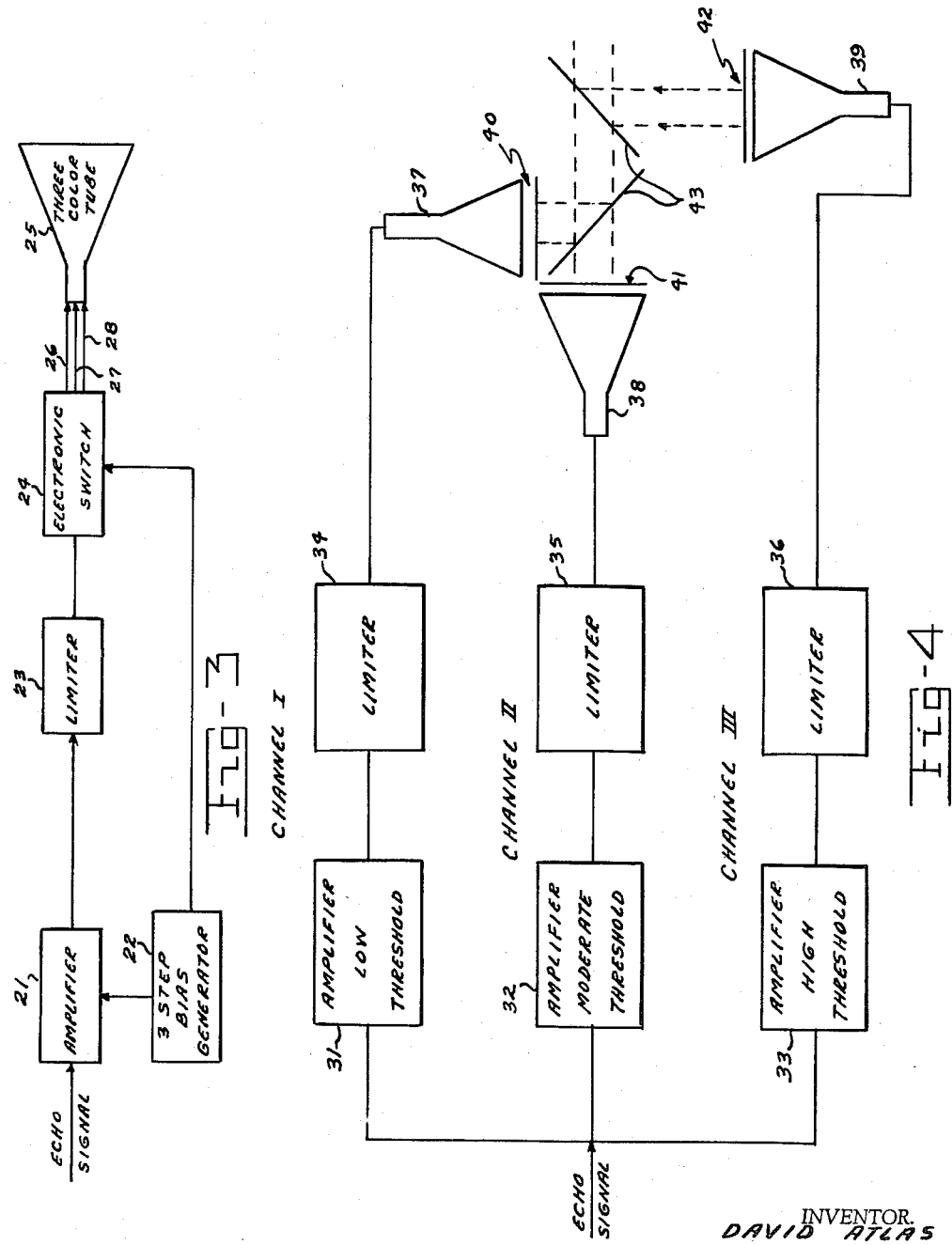

3,050,723
DEVICE TO DISCRETELY CHARACTERIZE LEVELS OF SIGNAL INTENSITY IN RADAR MAPPING AND COMPUTER DISPLAYS
David Atlas, 62 Wiswall Road, Newton Centre, Mass.
Original application Jan. 4, 1955, Ser. No. 479,876, now Patent No. 2,911,640, dated Nov. 3, 1959. Divided and this application Apr. 11, 1958, Ser. No. 728,023
3 Claims. (Cl. 343—11)
(Granted under Title 35, U.S. Code (1952), sec. 266)

The invention described herein may be manufactured and used by or for the United States Government for governmental purposes without payment to me of any royalty thereon.

This invention relates to a device to discretely characterize levels of signal intensity in radar mapping displays and particularly to devices to visually indicate the intensity of rainstorms.

This application is a division of application Serial Number 479,876 filed January 4, 1955, now Patent Number 2,911,640.

This invention relates to an improvement over the radar storm contour mapping device disclosed in my U.S. Patent No. 2,656,531 and over my copending application Serial Number 461,944, filed October 12, 1954, which discloses the use of a radar system for plotting contour maps of rainstorm intensities as a function of two geographical coordinates. This system depends upon the fact that the intensity of the reflected radar pulses, and hence of the voltage induced in the receiving antenna, varies as a direct function of the density or intensity of the reflecting raindrops. These reflected pulses are then fed through a modified radar receiver which includes a network capable of separating different classes of signal intensity levels. The output of this network provides a positive energization of the display beam of the scope or other indicating device for one class of signal intensity and no energization for the adjacent class thus displaying a series of alternately white and black bands the boundary lines between which are equiecho lines of a contour map of rain intensity.

The major disadvantage of the system described above is that the black areas within the reflecting region are similar in color tone to regions of no reflectivity, except for the noise background that may be present. In a complex storm, for example, this may cause serious confusion. Furthermore, in a system having four or more channels or bands, consecutive white areas or bands can be identified only by counting the number of bands in from the outermost one of lowest echo intensity class.

It is an object of the present invention to overcome these limitations by providing means for discretely identifying adjacent bands so as to give a positive indication of what intensity class is represented.

It is a further object of this invention to provide such a positive indication means in a circuit of general application so that a contour map of any arbitrary three parameter function may be displayed and accurately read from a two dimensional display device.

These objects are attained in the present invention either by applying a characteristic modulation to the signals going to produce the various bands so that they will appear with a distinctive cross hatching or by applying the signals representing the various different intensity levels to a color display system or tube so that each band will have a distinctive color. With such a means of positive identification it is possible to use the system to display a contour map of a three parameter function of any arbitrary form. The third parameter signal is sent through a signal intensity classifying circuit the outputs of which activate their respective band displays. It is apparent that in the radar system, the transmitting and receiving antenna acting in conjunction with the varying reflectivity of the rainstorm, determine the value of the third parameter (here storm reflectivity) as a function of the first two parameters here the angular position of the radar beam and the range to the storm (geographical coordinates). By the present invention the field of application and accuracy of my system are greatly extended.

These and other objects and advantages will be more fully described and explained in the following specification and drawings forming a part thereof wherein like reference characters indicate like parts throughout and in which:

FIGURE 1 is a schematic diagram of a one channel system embodying the present invention, and the resulting display pattern;

FIGURE 1a is a diagrammatic view of the waveforms produced by the circuit of FIGURE 1.

FIGURE 2 is a block diagram of a multichannel system embodying the present invention;

FIGURE 2a is a diagrammatic view of the waveforms produced by the circuit of FIGURE 2;

FIGURE 3 is a block diagram showing a single channel system with a color tube; and FIGURE 4 is a block diagram showing a multichannel system with a color display device.

Referring now to the drawings, FIGURE 1 shows a single channel signal intensity classifying circuit with means for applying a characteristic modulation to each class. In this circuit the pulse repetition frequency trigger from the radar system 3, which is shown as waveform A in FIGURE 1a, is passed through a 3:1 count down circuit 1 and used to trigger a three step bias generator 2 which may be of the type disclosed in detail in my copending application Serial Number 461,944. The output of this generator is shown at B of FIGURE 1a, and is applied to amplifier 4 to sequentially alter its bias or threshold of signal detectability. A low bias as on step 1 corresponds to high gain. Echo signal from the radar receiver is applied to the input of amplifier 4. This signal would normally have the form shown at J in FIGURE 2a. The negative going signal output of amplifier 4 after passage through an optional integrator 5 is shown as waveform C in FIGURE 1a. Without any modulation the output of the limiter tube V3 would be shown by the dashed waveform D. This would result from the operation of the circuit as explained in my copending application referred to above. That is, on step 1, amplifier 4 would pass all signals above the lowest threshold of detectability; on step 2 all signals above the next highest; and on step 3 it would pass only those signals above the highest level of detectability giving the unmodulated limiter output waveform D. However, in order to obtain discrete or characteristic modulation for the output of each step, the step bias B is sent through the differentiator of block 6 which has an output as shown at E. The circuit 6 also includes a scale of two counter after the differentiator. The counter responds only to positive pulses so that the final output of block 6 in a positive pulse at the beginning of step 2. This is used to trigger multivibrator 7 either without delay or as shown with a controlled pulse delay produced by circuit 8 whose positive output pulses are shown by waveform F. The trigger for multivibrator 7 may be obtained in any desired manner as long as it starts at step 2. The multivibrator output, waveform G is used to provide a negative gate to turn on the square wave oscillator 9 whose output is shown as waveform H. The square wave oscillator output is clamped by tube V1 so that the input to the cathode follower V2 never is positive.

The cathode follower output is therefore a series of square waves reducing the cathode potential below its quiescent value. The cathode of the limiter tube V3 draws this modulated bias from the cathode of V2. When there is no negative signal on the grid of V3, the negative pulses on the cathode cause the output voltage on the plate to drop below the quiescent plate voltage $e_p$. When signal is applied to the grid of V3, V3 is driven to cutoff during the upswing of the square wave modulation and conducts during the downswing, thus producing waveform I at the plate of V3. The clamping level of V4 is shown by the dashed line across waveform I, V4 being adjusted to clip off all signals below that line. The remainder of waveform I above the dashed line is passed on to the display device which may be a cathode ray tube. Waveform I is applied so as to control the intensity of the writing beam of the display device which, of course, has the position of its writing beam synchronized with the radar in the conventional manner. During steps 1 and 3, the square wave oscillator is turned off and limiter V3 is biased just above cutoff by the quiescent voltage on the cathode of V2 and by adjustment of the grid bias voltage $E_{g1}$ on V3.

When the pulse delay 8 is out of the circuit the striations produced on step 2 are exactly circumferential as shown in FIGURE 1. When the pulse delay is in the circuit, the delay in starting the square wave oscillator is determined by the position of a 360 degree potentiometer 10 which is driven in synchronism with the azimuth drive of the antenna by a motor 11.

The total resistance of potentiometer 10 is chosen to give a maximum pulse delay equal exactly to one cycle of the square wave oscillator. Thus as the antenna beam scans through the storm, the delayed square wave modulation provides a cross hatched striation which deviates from circumferential. The exact curvature would be determined by the gear ratio between the antenna drive and the delay potentiometer 10.

There are undoubtedly a large number of combinations of circuits which would accomplish the same result as that obtained with the circuit of FIGURE 1. For example, the limiter output and the square wave oscillator output could both go to a standard mixer stage. Alternatively the square wave might gate the suppressor of a gated amplifier. The essential point of the circuit of FIGURE 1 is the application of a square wave modulation bias to the second step of the three step bias. Normal or unmodulated bias is used on steps 1 and 3. As may be seen from FIGURE 1a, step 1 occurs on every third sweep of the PPI beam. From a consideration of the waveforms, particularly I, FIGURE 1a, it will be apparent how the pattern of FIGURE 1 is derived. The central portion of the display representing the heavy core of the storm will be illuminated on every sweep and will appear solid white, the striations of step 2 being obscured. It will be noted that on step 3 the amplifier has high bias or low gain, so that on step 3 itself only strong signals from the central core of the storm are reproduced and the two outer regions are not illuminated. At the lower bias of step 2 only signals from the two innermost portions of the storm will be reproduced. Step 2 output will give the circumferential hatching of the mid-region with the outer regions not illuminated. Of course, at the weaker outermost portions of the storm only the radial striations of step 1 which has the highest gain will appear. Thus the circuit will produce a contour map of rainstorm intensity with an easily distinguished pattern of display for each discrete level of intensity.

An alternative signal intensity classifying circuit of the multichannel type is shown in the block diagram of FIGURE 2 and the waveform diagram of FIGURE 2a. The signal input J to the contour mapping circuit may consist either of unsaturated intermediate frequency or video signals and is represented schematically by the waveform J in FIGURE 2a. It should be noted that this waveform is the envelope of the input echo signals which, for a storm, actually consist of noise-like pulses. Amplifiers 11, 12 and 13 of channels I, II and III, respectively, are biased to thresholds I, II and III, respectively, as shown on waveform J. Each amplifier passes signal only during the time when its corresponding threshold is exceeded by the input signal. The outputs of amplifiers 11, 12 and 13 are shown by the dashed waveforms at K, L and M, respectively, in FIGURE 2a. These outputs are passed on to limiters 14, 15 and 16 which would ordinarily have waveform outputs N, O and P, respectively. The limiter outputs are connected in parallel to the intensity control element of the display device writing beam, which, as in FIGURE 1, is synchronized as to position with the radar.

If these outputs were added directly without any modulation or further characterization and then applied to the intensity control of the display device, the radar display would show three discrete tones of intensity, the heaviest being the region of overlap of all three outputs, and the lightest being the region between that encompassed by the output of channel III and that encompassed by the output of channel II. This is the conventional multitone system which has been standard in some airborne mapping radars such as the AN/APS-23. Such a multitone system would not, however, provide foolproof identification of the various classes of echo intensity or of the contours represented by their boundaries.

To overcome this disadvantage, characteristically modulated bias voltages are applied to limiters 14 and 15. The output of the modulated bias generator 17 is applied to limiter 14 of channel I and is illustrated by waveform Q in FIGURE 2a. Bias generator 17 may be a multivibrator operated off a 2:1 or N:1 count down trigger from the PRF with the cathode voltage alternately turning limiter 14 or its output on and off. The output of channel I will then be as shown at R in FIGURE 2a. As the antenna and the display beam rotate echo signal is displayed only on every other sweep to give a radially striated effect similar to that shown schematically in FIGURE 1. The modulation may be at a lower frequency than half the PRF if the writing beam of the radar display moves less than a beam width per pulse. For example, in order to obtain the striated effect when the radar is operating at N pulses per beam width of the writing beam, the modulation frequency should be equal to or less than the PRF divided by N.

As in the embodiment of FIGURE 1 an integrator (not shown) could also be used either before or after the amplifiers 11, 12 and 13. In both embodiments the integrator is optional in that it tends to improve the smoothness of response of the circuit but is not critical to the operation of either embodiment.

In order to characterize the channel II output, the modulated bias for limiter 15 may consist of a square wave having a period equal to or greater than twice the range resolution of the radar. Block 18 of FIGURE 2 may be a square wave oscillator to generate such a modulated bias which is applied to limiter 15 in the same manner as in the analogous portion of the circuit of FIGURE 1. The phase modulation 19 corresponds to the pulse delay of FIGURE 1 and as before is driven by the angular drive 20 of the display beam. This phase modulation may be omitted if purely circumferential hatching is desired. Channel II output would then be chopped in range similar to waveform S of FIGURE 2a. On consecutive sweeps the final output of channel II would be similar to the waveform T. In plan position on the radar display signals of moderate intensity would be presented in circumferential arcs and superimposed on the radially striated output of channel I thus giving a cross hatched offset similar to that shown in FIGURE 1.

In a three class or three channel system it would not be necessary to modulate the output of channel III. Its output would appear like waveform U from an input wave of the form shown at V and would present the solid central core on the PPI display which thus represents the region of heavy signal intensity or heavy rainfall.

It should be noted that the types of modulation employed in channels I and II may be interchanged. It is necessary only that the unmodulated output be associated with the highest class of echo intensity since the unmodulated output would otherwise overlap the output of one or more of the modulated channels and obliterate their striations in the final display. It is of course also possible to vary the type of modulation applied to any channel. The example given above is merely illustrative of one possible type. Furthermore, any number of channels greater than one may be used in this embodiment, it being necessary only that each have a characteristic modulation distinguishing its output from all others.

The circuits shown in FIGURES 1 and 2 may be modified as shown in FIGURES 3 and 4 to produce bands of characteristic color instead of bands of characteristic hatching. In general the modulation bias of circuits are removed and the outputs representing each class of signal intensity are applied so as to activate different color display.

In FIGURE 3 signal input goes to an amplifier 21 the threshold of detectability of which is controlled by a three step bias generator 22 similar to the unit 2 of FIGURE 1. The output of amplifier 21 goes to limiter 23 and thence to a three position electronic switch 24. The switch 24 is also controlled by the three step bias generator 22 in such a fashion that the output on step 1 will go to line 26, on step 2 to line 27, and on step 3 to line 28. The lines 26, 27 and 28 are in turn connected to the three color control elements of a tricolor tube 25. Of course, the precise manner of connection will depend on the type of color tube used, but in any event the connection is such that the output from each separate step will energize a different color. If it is desired to use more than three steps the connections would be such that combinations of the primary colors would be energized for the additional steps. The position of the beam is, of course, synchronized with the radar. It is apparent that rather than the hatching effect of FIGURE 1b this circuit of FIGURE 3 will characterize each region of different intensity class by a different color. As in the other circuits the boundary lines between regions represent contour lines of equiecho intensity.

It is, of course, apparent that many variations could be made in the type of color display. For example, the tricolor tube could be replaced by a black and white tube having a rotating color filter in front of it to be used in conjunction with color photography. If the rotation of the color filter were synchronized with the change of step bias so that a different color filter section appears before the tube for each different step, the color photograph would then record a contour map display similar to that presented on the tricolor tube.

FIGURE 4 illustrates the use of a color display in a multichannel system. Here, channel I consisting of amplifier 31 and limiter 34 has a low threshold, channel II consisting of amplifier 32 and limiter 35 has a moderate threshold, and channel III consisting of amplifier 33 and limiter 36 has a high threshold. This portion of the circuit operates in the same manner as would the circuit of FIGURE 2 if the modulating elements were omitted. The output of channel I goes to display tube 37 having a color filter 40; the output of channel II goes to display tube 38 having color filter 41; and the output of channel III goes to display tube 39 having color filter 42. The displays are then combined optically by the half silvered mirrors 43. The beam position of each tube is synchronized with the radar. In the final display, the central core of the storm, representing that region from which echoes are passed by all channels and all filters, would appear in the color corresponding to the mixture of all three colors. In most instances this would be white. The region in the storm returning moderate signals would energize channels II and III and would appear in the color corresponding to the mixture of colors from filters 41 and 42. Finally, the outer region of the storm corresponding to light intensity would have the color of filter 40.

It is of course obvious that the optical system illustrated in FIGURE 4 could be replaced by an appropriate three color tube, the output signals from each channel being made to energize the proper color by means of standard circuitry for the particular tube employed.

It is to be noted that in all the systems described above the discrete bands of characteristic hatching or color may correspond either to discrete classes of echo intensity or to discrete classes of target reflectivity. If the echo signals which are operated upon by the contour mapping circuits are directly proportional to the echo intensities received at the antenna, the resulting displays present discrete classes of echo intensity throughout the detectable reflecting region. If, however, the received echo signals are first amplified by a sensitivity time control circuit of the type disclosed in my U.S. Patent No. 2,656,531 so that the signal input to the contour mapping circuit is independent of target range, the resulting displays present discrete classes of target reflectivity.

This it is seen that I have provided an accurate means of presenting a two dimensional contour map of a three parameter function which as a special case includes the mapping of rain intensity as a function of two geographical coordinates. In all cases the distinctive presentation of each band either by hatching or by color makes it possible to instantly identify what intensity class is represented by each band and to accurately trace the boundaries between bands which boundaries are the desired contour lines of the function being mapped.

The embodiments of the invention described above are for purposes of illustration and example only. Having thus described my invention what I claim is:

1. In a storm mapping system having a storm scanning radar, an amplifier limiter channel connected to receive echo signals from the radar, a step bias generator, a first circuit connecting the output of said step bias generator to said amplifier limiter channel so as to sequentially change the threshold of detectability in said channel in stepwise fashion, a multicolor display device having a plurality of color inputs, a plural position switch connecting the output of said channel to each input of said multicolor display device, a second circuit connecting the step bias generator in operating relation to said switch whereby the signal passed by each step of detectability in said channel actuates a different color in said multicolor display device.

2. For use with a radar system having means for scanning an area with directionally radiated periodic pulses of high frequency energy, means for receiving echo signals from reflecting objects illuminated by said radiation and a plan position indicator for visually displaying said echo signals at azimuth and range positions corresponding to the azimuth and range positions of the reflecting objects producing the echo signals, a network for plotting an intensity contour map of a storm in the surveillance area of said radar system, said network comprising: a low threshold amplifier-limiter channel, an intermediate threshold amplifier-limiter channel and a high threshold amplifier-limiter channel, each amplifier-limiter channel having a substantially constant output for all input signals exceeding its threshold; means for applying said echo signals to the inputs of said amplifier-limiter channels in parallel;

means synchronized with the radiated pulses of said radar system for blocking transmission through one of said low and intermediate threshold channels for the duration of a pulse repetition interval following alternate radiated pulses; means for applying a characteristic amplitude modulation to the echo signals in the other of said low and intermediate threshold channels; and means for applying the outputs of the three amplitude-limiter channels in parallel to the echo signal input of said plan position indicator.

3. For use with a radar system having means for scanning an area with directionally radiated pulses of high frequency energy and means for receiving echo signals from reflecting objects in the scanned area, apparatus for producing a two dimensional intensity contour map of a storm in the scanned area of said radar system, said apparatus comprising: a plan position indicator for visually displaying said echo signals at azimuth and range positions corresponding to the azimuth and range positions of the reflecting objects producing the echo signals, said indicator comprising a multi-color cathode ray display device having three color inputs; a low threshold amplifier-limiter channel, an intermediate threshold amplifier-limiter channel and a high threshold amplifier-limiter channel, each amplifier-limiter channel having a substantially constant output for all input signals exceeding its threshold; means for applying said echo signals to the inputs of said amplifier-limiter channels in parallel; and means connecting the output of each amplifier-limiter channel to a different one of the three color inputs of said cathode ray device.

References Cited in the file of this patent
UNITED STATES PATENTS

| | | |
|---|---|---|
| 2,758,298 | Sunstein | Aug. 7, 1956 |
| 2,786,993 | Reid | Mar. 26, 1957 |